2,914,560
NITROGENOUS COMPOUNDS

Dale N. Robertson, Midland, Mich., assignor to The Dow Chemical Company, Midland, Mich., a corporation of Delaware No Drawing. Application October 18, 1956
Serial No. 616,654

6 Claims. (Cl. 260—566)

This invention relates to nitrogenous compounds and particularly N-arylidene-normal-alkylamine Schiff bases having the structure $$X-CH=N-(CH_2)_n-CH_3$$

wherein X represents an alkyl substituted phenyl radical having the empirical formula, $C_9H_{11}-$, and wherein $n$ is an integer of from 2 to 3, inclusive.

The products of this invention are light-yellow liquids which frequently turn brown on standing. These compounds are soluble in organic solvents such as acetone, ethanol, xylene and kerosene, and substantially insoluble in water. The compounds are useful as parasiticides and are adapted to be employed for the control of bacterial and fungal organisms. They are also useful as intermediates in the preparation of other chemical compounds.

The new compounds are prepared by the reaction of a suitable aromatic aldehyde and with a normal-alkylamine, i.e. normal-propylamine or normal-butylamine, to obtain the desired N-arylidene-normal-alkylamine and water of reaction. Good results are obtained when substantially equimolar amounts of the reactants or a slight excess of the amine are employed. The reaction is preferably carried out in the presence of an inert water-immiscible organic solvent such as benzene, xylene or cyclohexane.

In carrying out the reaction, the aromatic aldehyde and normal-alkylamine are dissolved in the water-immiscible solvent and the mixture heated to codistill the water of reaction substantially as formed as an azeotrope. The reaction is conveniently carried out in an apparatus designed to collect the distillate and permit the solvent to flow back into the reaction zone. After completion of the reaction, the mixture is heated in an ordinary distilling apparatus to distill off the remaining solvent and excess amine, if employed, and to recover an N-arylidene-normal-alkylamine product as residue. The latter product may be purified, if desired, by conventional procedures such as by fractional distillation.

The following examples illustrate the invention but are not to be construed as limiting:

Example 1.—N-(4-isopropylbenzylidene)-normal-butylamine

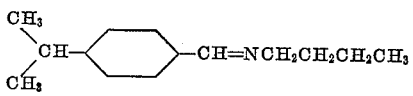

71.6 grams (0.483 mole) of 4-isopropylbenzaldehyde and 39 grams (0.53 mole) of normal-butylamine were mixed together in 150 milliliters of benzene. The reaction mixture was heated to distill off the water of reaction as a benzene-water azeotrope. The heating was continued until no more water distilled. The remaining solvent and excess amine were then removed by distillation to obtain an N-(4-isopropylbenzylidene)-normal-butylamine product as an amber-colored liquid having a refractive index, $n_D^{25°\ C.}$ of 1.5199.

Example 2.—N-(2,4,6-trimethylbenzylidene)-normal-butylamine

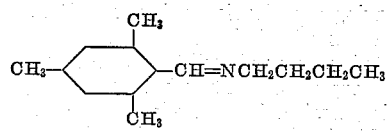

14.8 grams (0.1 mole) of 2,4,6-trimethylbenzaldehyde and 10 milliliters (0.1 mole) of normal-butylamine were mixed together in 50 milliliters of benzene. The reaction mixture was heated to distill off the water of reaction as a benzene-water azeotrope. The heating was continued until no more water distilled. The remaining solvent was then removed by distillation and an N-(2,4,6-trimethylbenzylidene)-normal-butylamine product recovered as residue. The product was a liquid having a molecular weight of 203.3.

Example 3.—N-(4-isopropylbenzylidene)-normal-propylamine

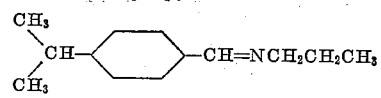

71.6 grams (0.483 mole) of 4-isopropylbenzaldehyde and 31.3 grams (0.53 mole) of normal-propylamine are mixed together in 125 milliliters of benzene. The reaction mixture is heated to distill off the water of reaction as a benzene-water azeotrope. The heating is continued until no more water distills. The remaining solvent and excess amine are then removed by distillation and an N-(4-isopropylbenzylidene)-normal-propylamine product recovered as residue. The product is a liquid having a molecular weight of 189.3.

Example 4.—N-(2,4,5-trimethylbenzylidene)normal-propylamine

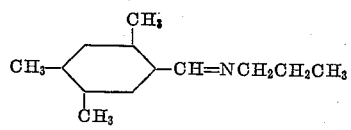

In a manner similar to that described in Example 3, 71.6 grams (0.483 mole) of 2,4,5-trimethylbenzaldehyde, 31.3 grams (0.53 mole) of normal-propylamine and 150 milliliters of xylene are mixed together. The resulting mixture is heated to distill out first the water of reaction and then the solvent and excess amine to obtain an N-(2,4,5-trimethylbenzylidene)-normal-propylamine product having a molecular weight of 189.3.

Example 5.—N-(3-ethyl-4-methylbenzylidene)-normal-propylamine

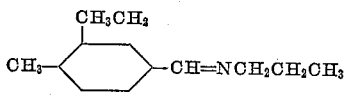

In a manner similar to that described in Example 3, 143.2 grams (0.966 mole) of 3-ethyl-4-methylbenzaldehyde, 62.6 grams (1.06 moles) of normal-propylamine and 250 milliliters of benzene are mixed together. The resulting mixture is heated to distill out first the water of reaction and then the solvent and excess amine to obtain an N-(3-ethyl-4-methylbenzylidene)-normal-propylamine product having a molecular weight of 189.3.

Example 6.—N-(4-normal-propylbenzylidene)-normal-propylamine

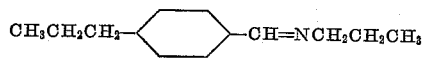

In a manner similar to that described in Example 3, 71.6 grams (0.483 mole) of 4-normal-propylbenzaldehyde, 31.3 grams (0.53 mole) of normal-propylamine and 150 milliliters of cyclohexane are mixed together. The resulting mixture is heated to distill out first the water of reaction and then the solvent and excess amine to obtain an N-(4-normal-propylbenzylidene)-normal-propylamine product having a molecular weight of 189.3.

The products of this invention are useful as parasiticides adapted to be employed for the control of bacterial and fungal organisms. They are particularly useful as toxicants in germicidal preparations. In a representative operation, N - (4 - isopropylbenzylidene) - normal - butylamine was added to bacteriological media to give a concentration of 0.05 percent and the media inoculated with *Staphylococcus aureus* and incubated at 30° C. for 4 days. At the end of this period, complete inhibition of growth of the organism was observed.

These products are also useful as intermediates for the preparation of a variety of chemical compounds such as aralkylamines, and as intermediates in the preparation of compounds useful as stimulants, medicinals and emulsifying agents. Certain of these compounds have been employed in the preparation of nitroethylene compounds disclosed and claimed in a copending application by Dale N. Robertson, Serial No. 616,651, filed October 18, 1956, now U.S. Patent No. 2,855,443.

I claim:
1. An N-arylidene-normal-alkylamine having the structure

$$X-CH=N-(CH_2)_n-CH_3$$

wherein X represents an alkyl substituted phenyl radical having the empirical formula, $C_9H_{11}-$, and wherein $n$ is an integer of from 2 to 3, inclusive.

2. N-(4-isopropylbenzylidene)-normal-butylamine.
3. N-(2,4,6-trimethylbenzylidene)-normal-butylamine.
4. N-(4-isopropylbenzylidene)-normal-propylamine.
5. N - (2,4,5 - trimethylbenzylidene) - normal - propylamine.
6. N - (3 - ethyl - 4 - methylbenzylidene) - normal-propylamine.

References Cited in the file of this patent
UNITED STATES PATENTS
2,765,340  Haury _____ Oct. 2, 1956
OTHER REFERENCES
Campbell et al.: J.A.C.S., vol. 70, pp. 3868–70 (1948).
Skita: Beilstein's Handbuch, vol. 7, 2nd Supplement, page 230 (1948).